United States Patent
Grossman et al.

[11] Patent Number: 5,907,321
[45] Date of Patent: May 25, 1999

[54] METHOD FOR TRANSMITTING AND DISPLAYING AN INTERCHANNEL INTERVAL IMAGE IN A CABLE SYSTEM

[75] Inventors: Martin E. Grossman, Villanova, Pa.; Wayne R. Sibole, Belleair, Fla.

[73] Assignee: Spot Com, Inc., Belleair, Fla.

[21] Appl. No.: 08/622,788

[22] Filed: Mar. 27, 1996

[51] Int. Cl.[6] .................................................. H04N 7/10
[52] U.S. Cl. .............................. 345/327; 348/6; 348/10
[58] Field of Search ............................. 348/10, 6, 2, 12, 348/13, 734; 455/6.3, 6.2, 6.1, 5.1, 4.2, 3.1; H04N 7/10, 7/14

[56] References Cited

U.S. PATENT DOCUMENTS

| | | |
|---|---|---|
| 4,344,090 | 8/1982 | Belisomi et al. . |
| 4,751,578 | 6/1988 | Reiter et al. . |
| 4,941,040 | 7/1990 | Pocock et al. . |
| 5,099,319 | 3/1992 | Esch et al. . |
| 5,221,962 | 6/1993 | Backus et al. . |
| 5,233,423 | 8/1993 | Jernigan et al. . |
| 5,430,493 | 7/1995 | Kim . |
| 5,438,356 | 8/1995 | Ushiki et al. . |
| 5,446,488 | 8/1995 | Vogel . |
| 5,446,919 | 8/1995 | Wilkins ..................................... 348/10 |
| 5,600,364 | 2/1997 | Hendricks et al. ......................... 348/9 |

FOREIGN PATENT DOCUMENTS

| | | |
|---|---|---|
| 592726 | 2/1960 | Canada . |
| 0554577 | 8/1993 | European Pat. Off. . |
| 60-176373 | 9/1985 | Japan . |
| 61-39687 | 2/1986 | Japan . |
| 2264604 | 9/1993 | United Kingdom . |

*Primary Examiner*—Nathan Flynn
*Assistant Examiner*—Vivek Srivastava
*Attorney, Agent, or Firm*—Larson & Larson, P.A.; James E. Larson

[57] ABSTRACT

A system and method is provided for displaying an image in a cable system including a cable headend having a plurality of cable channels and a subscriber unit with a video display, a receiver for receiving the cable channels from the cable headend, a channel selector for selecting a cable channel of the plurality of cable channels and applying the selected cable channel to the video display in order to display an image. Advertising information is transmitted to the subscriber unit. A first cable channel is selected and a first image is displayed in accordance with the first selected cable channel. A second cable channel is selected and a second image is displayed in accordance with the second selected cable channel. A channel change is determined according to the selecting of the second channel. The transmitted advertising information is applied to the video display in response to the determining to provide a display of an image representative of the advertising information. A time period between channel changes is determined and display of the image is inhibited for the time period. The advertising information is stored in the subscriber unit. The advertising information can include identification information corresponding to an advertiser.

25 Claims, 3 Drawing Sheets

METHOD FOR TRANSMITTING AND DISPLAYING AN INTERCHANNEL INTERVAL IMAGE IN A CABLE SYSTEM

BACKGROUND OF THE INVENTION

1. Field of the Invention

The invention relates to the field of cable television systems and, in particular, to transmitting advertising information from a cable headend to a subscriber unit of a cable television system and applying the transmitted advertising information to a television receiver display attached to the subscriber unit.

2. Prior Art

In the prior art it is well known for large numbers of homes subscribing to cable television systems to receive a number of commercial and public television signals by way of transmission cables. Each television signal includes video and audio signals, which can be transmitted along a coaxial cable by a system headend within a discrete frequency band known as a channel. The subscriber tunes a television receiver to the desired channel and receives a composite television signal.

It is known to transmit information in addition to the television signals to the subscribers of prior art cable systems during blank field intervals of the video signals. For example, U.S. Pat. No. 4,288,809, issued to Yabe, describes transmitting alphanumeric information during the blank field intervals. The alphanumeric information is stored in a temporary memory for display on a television receiver within a subscriber unit. Yabe further describes an index that permits the viewer to determine by an overlay on the screen what information is available. The index is contained on a RAM which can be updated by the blank field interval transmitted data.

U.S. Pat. No. 4,161,728, issued to Insam, also discloses means for displaying information sent during field blanking of video information. The Insam patent describes a memory unit for storing information to be displayed, a display unit for synchronizing and producing addresses to memory containing the information to be displayed, a decoder unit, a control unit which is accessible through remote control, and a microprocessor which is responsive to programmed instruction.

U.S. Pat. No. 4,052,719, issued to Hutt, also describes the transmission of auxiliary information during the field blanking intervals of video signal transmission. On the receiving end, a television system has a RAM for collecting and storing the transmitted information, a selector, and a reading device. The viewer has the choice of viewing the video signal or the auxiliary information separately or together on the screen.

It is also known for stored advertising information to be displayed on television receivers such as the television receiver found in cable television systems. For example, U.S. Pat. No. 4,344,090, issued to Belisomi, discloses a picture display device using a ROM to store coded data corresponding to a television image in memory. The coded data represents advertising information that can be viewed upon demand and can be superimposed upon a received video signal or viewed as an alternative to the received video signal. Pococh, U.S. Pat. No. 4,941,041, also teaches a system for selectively delivering television video for advertising.

U.S. Pat. No. 5,233,423, issued to Jernigan, teaches a television receiver equipped with a graphics generator capable of generating single or multiple graphic images from data representing advertisements permanently stored in a local memory device. Images corresponding to the advertisements are displayed when a control function of the receiver is activated.

However the advertising information of the above described systems cannot be updated because it is permanently stored in the local devices.

It is therefore an object of the present invention to provide a display of a visual image on a television receiver in a subscriber unit of a cable television system.

It is a further object to provide such a display of a visual image that can be updated.

It is a further object of the invention to transmit the updated images to the subscriber unit of the cable television systems over the same transmission cable as the cable television signals.

These and other objects and advantages of the invention will become more fully apparent from the description and claims that follow or may be learned by the practice of the invention.

SUMMARY OF THE INVENTION

A system and method is provided for displaying an image in a cable system including a cable headend having a plurality of cable channels and a subscriber unit with a video display, a receiver for receiving the cable channels from the cable headend, a channel selector for selecting a cable channel of the plurality of cable channels and applying the selected cable channel to the video display in order to display an image. Advertising information is transmitted to the subscriber unit. A first cable channel is selected and a first image is displayed in accordance with the first selected cable channel. A second cable channel is selected and a second image is displayed in accordance with the second selected cable channel. A channel change is determined according to the selecting of the second channel. The transmitted advertising information is applied to the video display in response to the determination of the channel change to provide a display of an image representative of the advertising information.

BRIEF DESCRIPTION OF THE DRAWINGS

In order that the manner in which the above-recited and other advantages and objects of the invention can be obtained, a more particular description of the invention briefly described above will be rendered by reference to specific embodiments thereof which are illustrated in the appended drawings. Understanding that these drawings depict only a typical embodiment of the invention and are not therefore to be considered limiting of its scope, the invention and the presently understood best mode thereof will be described and explained with additional specificity and detail through the use of the accompanying drawings.

DETAILED DESCRIPTION OF THE INVENTION

Figure 1:
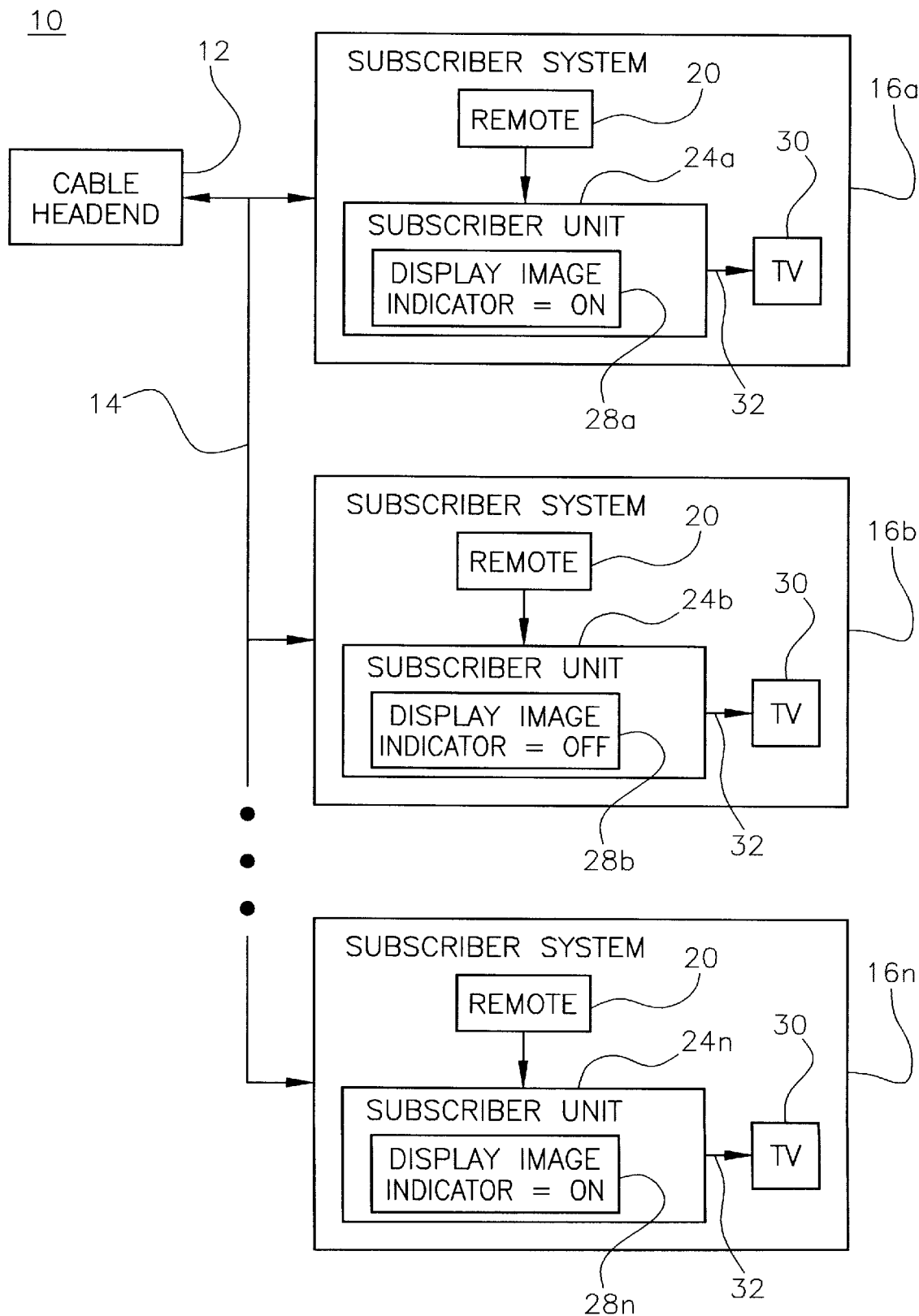
FIG. 1 shows a block diagram representation of a cable system including a cable headend and a plurality of subscriber units according to the present invention.

Referring now to FIG. 1, there is shown cable television system 10 according to the present invention. Cable television system 10 includes a cable headend 12 and a transmission cable 14. Cable headend 12 uses transmission cable 14 to apply television channels containing television signals to a number of cable subscriber systems 16a–n for display upon television receivers 30 within cable subscriber systems 16a–n. The television signals applied to cable subscriber systems 16a–n by way of transmission cable 14 can be any conventional cable television receivers signals well known to those skilled in the art.

Each cable subscriber system 16a–n of cable television system 10 includes a remote control device 20 for allowing a user of cable subscriber systems 16a–n to control television receivers 30. Television receiver 30 can be any information appliance including any conventional television receiver or visual display system capable of providing video output in response to signals on a transmission cable such as transmission cable 14. Remote control device 20 can be any conventional remote system for controlling television receivers 30. For example, remote control device 20 can be an infrared control device or a mechanical control device.

Cable subscriber systems 16a–n of cable television system 10 also include respective subscriber units 24a–n. Subscriber units 24a–n receive the television channels from cable headend 12, and, under the control of remote control device 20, select a television channel from the received channels. The signals of the selected channel are applied to television receivers 30. Subscriber units 24a–n of subscriber systems 16a–n can include any of the features of conventional cable system subscriber units well known to those skilled in the art.

Additionally, subscriber units 24a–n are provided with the ability to receive signals representative of advertising information for display of a visual image on television receiver 30 from cable headend 12 by way of transmission cable 14. The advertising information from cable headend 12 can be any information of any commercial value, such as a corporate logo, a trademark or a textual message. The advertising information can also be, for example, public service messages such as warnings against smoking, warnings against drinking while pregnant or reminders to immunize children. In the method of the present invention a subscriber unit such as subscriber unit 24a displays the visual image received from cable headend 12 on television receiver 30 when a user of subscriber unit 24a changes channels using remote control device 20.

When a user of a conventional subscriber unit changes channels there is normally a brief delay period between the displays of sequentially displayed channels on the television receiver of the conventional subscriber unit. The delay period can typically have a duration of approximately three hundred milliseconds to approximately five hundred milliseconds and is some-times referred to as the interchannel interval (ICI). In the preferred embodiment of the present invention the visual image from the cable headend is displayed on television receiver 30 during the ICI.

It is anticipated that users of subscriber units 16a–n will be offered a reduction in the cost of their cable service, a reduction in the cost of a utility such as their electric service or phone service or some other incentive for permitting visual images to be displayed on their television receivers 30. However, not all users within cable television system 10 may be interested in displaying the visual images from cable headend 12. Thus, a method is provided for determining which subscriber units 24a–n within cable television system 10 should display the transmitted visual image.

In order to indicate whether an individual subscriber unit 24a–n should display the visual image a display image indicator 28a–n is provided within each subscriber unit 24a–n. Display image indicators 28a–n can be software flags, hardwired connections, or any other kind of indicator. Thus, when a user changes channels using remote control device 20, subscriber units 24a–n check their respective display image indicators 28a–n. If a display image indicator 28a–n has the value ON, the subscriber unit 24a–n displays the visual image between displays of the sequentially displayed channels. If the display image indicator 28b has a value OFF, the display of the visual image is not provided.

For example, subscriber unit 24a displays the visual image from headend 12 because display image indicator 28a of subscriber unit 24a has the value ON. Subscriber unit 24b does not display the visual image because display image indicator 28b has the value OFF. Subscriber unit 24n also displays the visual image. In the preferred embodiment of the invention display image indicators 28a–n are stored in a location in a RAM. Storage of indicators 28a–n in a RAM permits the status of subscriber units 24a–n to be easily changed by, for example, cable headend 12 by writing over the previous status.

Figure 2:
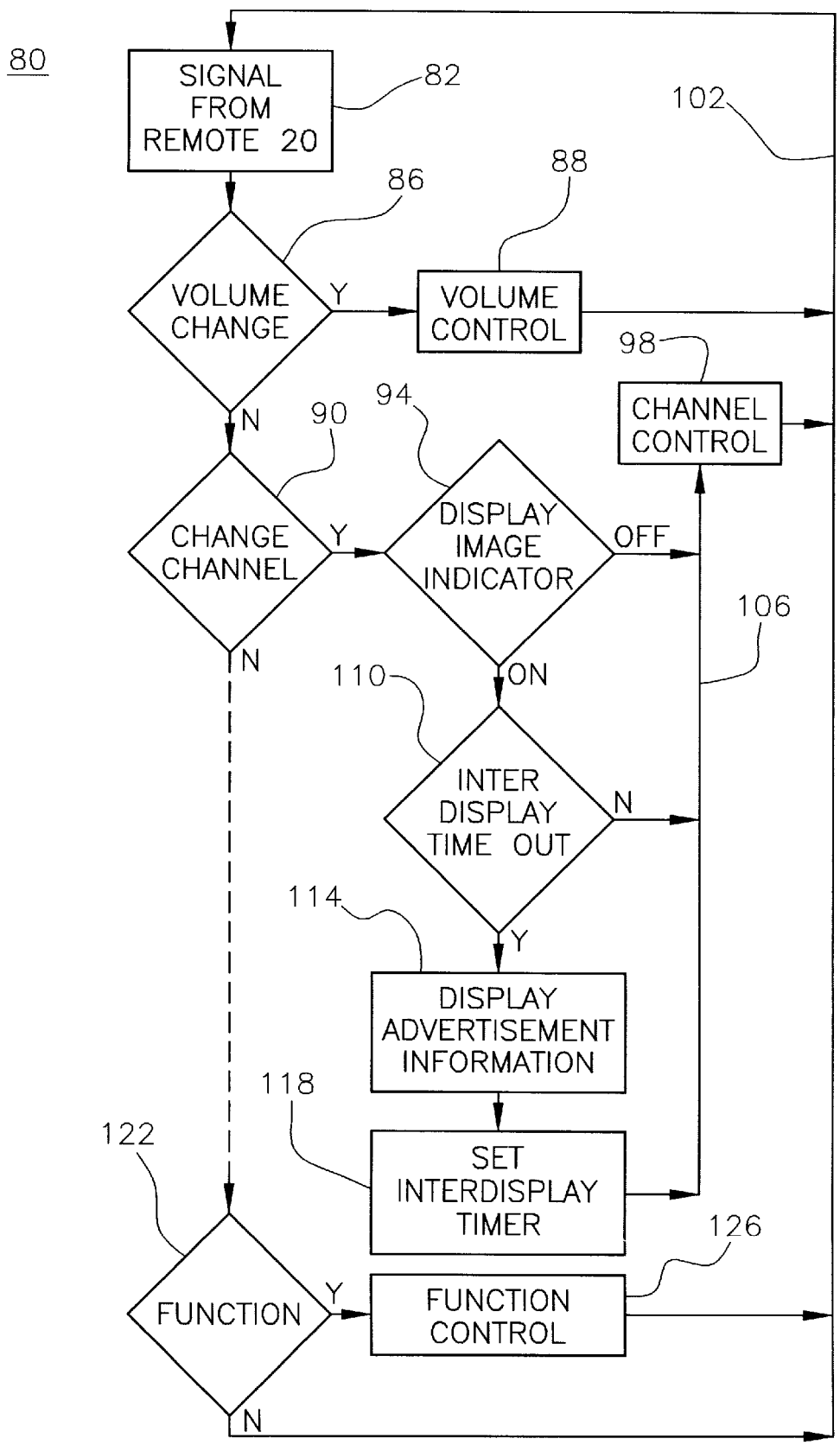
FIG. 2 shows a flow chart representation of a method for applying an image to a television display in response to a channel change by a user in accordance with the present invention.

Referring now to FIG. 2, there is shown a flow chart representation of advertising image display method 80. Advertising image display method 80 is executed within subscriber units 24a–n for selectively applying a visual image to television receiver 30 in response to a channel change by users of subscriber systems 16a–n of cable television system 10. Advertising image display method 80 can be included in a method, shown only in relevant portion, for servicing a number of different control signals from remote control device 20 provided in response to user commands as the user controls the display of television receiver 30.

When a control signal is received from remote control device 20, as shown in block 82, a series of decisions is provided in order to determine what type of change is commanded by the user. For example, a determination can be made whether the received control signal represents a volume change command as shown in decision 80. If the signal represents a volume change command execution of image display method 80 proceeds to volume control routine 88.

In volume control routine 88 the volume of television receiver 30 is raised or lowered in response to the volume command from remote control device 20 in a manner well understood by those skilled in the art. After execution of volume control routine 88, execution of image display method 80 proceeds by way of path 102 to block 82. Image display method 80 waits at block 82 for another signal from remote control device 20.

If the control signal received from remote control device 20 is not a volume change command, as determined in decision 86, execution of image display method 80 proceeds to decision 90. In decision 90 a determination is made whether the received control signal from remote control device 20 is representative of a channel change command from the user. If the signal is a channel change command a determination is made in decision 94 whether subscriber unit 24a–n executing image display method 80 displays visual images. This determination is made by reference to display image indicators 28a–n within subscriber units 24a–n.

If subscriber unit 24a–n performing the execution of image display method 80 is not set to display visual images, as indicated by display image indicator 28a–n, execution proceeds by way of path 106 to channel control routine 98. Channel control routine 98 can be any conventional channel control routine suitable for changing channels in response to a command from a user operated remote control device 20. After completion of channel control routine 98, execution of image display method 80 proceeds by way of path 102 to block 82.

In the preferred embodiment of advertising image display method 80, subsequent displays of a visual image can be inhibited for a predetermined period of time after a first display. The predetermined period of time during which further displays are inhibited is the interdisplay time interval. Thus, for example, a user can change channels and receive a display of the visual image as previously described. If the user changes channels again, before expiration of the interdisplay time interval, the image is not displayed again. If the user changes channels again, after expiration of the interdisplay time interval, the visual image is again displayed. In this manner, users rapidly changing channels do not have to view the visual image each time a channel is changed.

The duration of the interdisplay time interval can be any value selected and programmed into image display method 80. In the preferred embodiment of the invention it is believed that a suitable duration for the interdisplay time interval can be between approximately thirty seconds and approximately fifty seconds, with an interval of approximately forty seconds being the most preferred. In practice, however, it is believed that market considerations will determine the duration of the interdisplay time interval.

In order to provide the interdisplay time interval feature, a determination can be made in decision 110 whether the interdisplay time interval has expired when a channel change signal is determined in decision 90. If the interdisplay time interval has not expired, as determined in decision 110, it is not yet time to provide another display of the visual image, and execution of image display method 80 proceeds by way of path 106 to channel control routine 98.

If the interdisplay time interval has expired, as determined in decision 110, the visual image is displayed as shown in block 114. An interdisplay timer is set as shown in block 118 in order to prevent further displays of the visual image for the duration of the interdisplay time interval.

The duration of the display of the visual image according to image display method 80 can be any period of time consistent with the relevant legal and technical constraints. For example, since subliminal messages are not permitted under FCC rules, the duration of the display of the visual image should be in excess of at least fifty milliseconds, a commonly accepted limit for subliminal messages. Since users of cable subscriber systems 16a–n are accustomed to interchannel intervals in the range of one hundred to three hundred and fifty milliseconds on each occasion of a channel change, the duration of the display of the image is preferably selected to fit within this range. The duration selected is programmed into subscriber units 24a–n and implemented by image display method 80 as previously described.

Advertising image display method 80 can also determine whether any other function has been commanded by remote control device 20 prior to the return of execution to block 82. A command for a further function can be determined by a decision such as decision 122 and a corresponding control routine can be performed as shown in block 126. These determinations can be made according to methods well understood by those skilled in the art.

Figure 3:
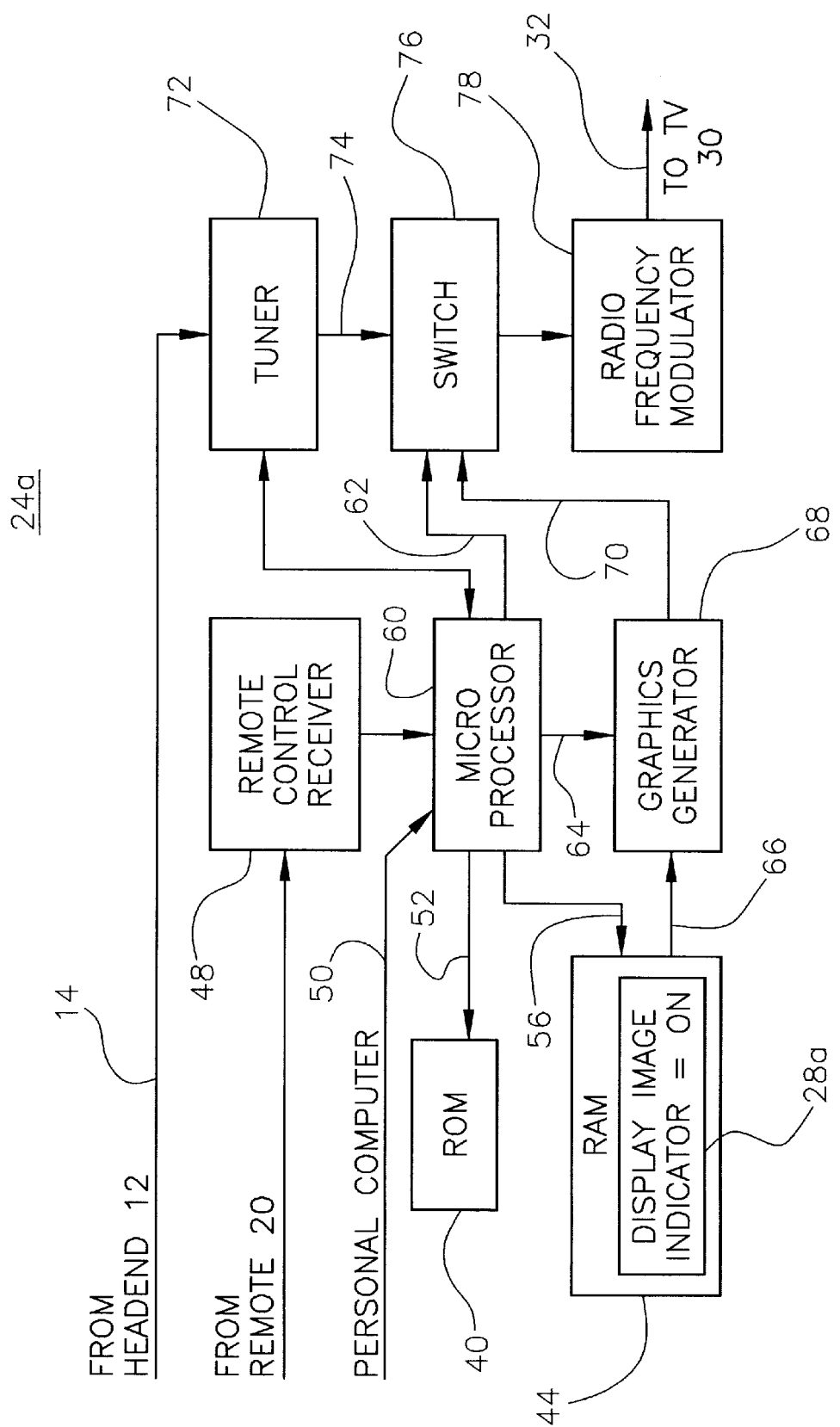
FIG. 3 shows a block diagram representation of a subscriber unit within the cable system of FIG. 1.

Referring now to FIG. 3, there is shown a block diagram representation of subscriber unit 24a of cable subscriber system 16a within cable television system 10. Within subscriber unit 24a television signals are received from cable headend 12 by way of transmission cable 14. The received television signals are applied to television receiver 30 by way of line 32. The remaining subscriber units 24b–n of cable television system 10 can be provided in a manner similar to that described for subscriber unit 24a or in any other manner.

Subscriber unit 24a includes microprocessor 60 suitable for controlling the operations of subscriber unit 24a, including execution of image display method 80 according to the method of the present invention. When a user operates remote control device 20 to send a command signal to subscriber unit 24a, the command signal is received by remote control receiver 48 of subscriber unit 24a and applied to microprocessor 60. Microprocessor 60 performs operations upon the control signal according to a control program stored in ROM 40 which is accessed by way of bidirectional bus 52.

Tuner 72 of subscriber unit 24a can be a conventional cable tuner for receiving and selecting channels of the plurality of channels transmitted along transmission cable 14 by cable headend 12. Tuner 72 thus operates as a channel selector within subscriber unit 24a and can therefore be realized by any device capable of selecting transmitted channels. Under the control of microprocessor 60 tuner 72 applies the signal of a selected channel to switch 76 by way of tuner line 74. The signals applied to switch 76 from tuner 72 can be applied to radio frequency modulator 78 under the control of microprocessor 60. From radio frequency modulator 78 the signals are applied to television receiver 30 for display. Microprocessor 60 controls switch 76 by way of switch control line 62.

The visual image transmitted from cable headend 12 preferably resides in RAM 44 of subscriber unit 24a. It is stored in RAM 44 by microprocessor 60 according to program instructions residing in ROM 40 by way of bus 56 when it is received from cable headend 12 by way of tuner 72. Any method of transmitting information by way of transmission cable 14 through tuner 72 for storage in RAM 44 can be used.

The visual image can be transmitted over transmission cable 14 in the bandwidth of a dedicated advertising information channel. The visual image can also be transmitted in unused bandwidth between channels wherein the unused bandwidth can be dedicated to transmission of the visual image. For example, the conventionally unused bandwidth between channels four and five can be available and can therefore be dedicated to carrying visual images. If dedicated bandwidth is used in this manner, tuner 72 can be adapted to always select the dedicated bandwidth and transmit the advertising information to microprocessor 60 as it arrives. Additionally, the visual image can be transmitted in unused time intervals within channels carrying program material.

The signals representative of the visual image transmitted from cable headend 12 can be analog or digital signals, although digital signals are preferred. Signals representing any number of different visual images for transmission to subscriber systems 16a–n can be stored at cable headend 12 on optical disks or magnetic tape or any other information storage medium. They can be stored in a digital format or in an analog format for reproduction by an optical disk player, a video cassette player or another reproduction device prior to being applied to cable 14 for transmission to subscriber systems 16a–n.

Display image indicator 28a can be stored within RAM 44 of subscriber unit 24a. When microprocessor 60 receives a channel change command from remote control device 20, as determined by decision 90 of image display method 80, microprocessor 60 accesses display image indicator 28a from RAM 44 to determine whether a visual image is to be displayed. If the visual image is to be displayed the signals representative of the image are applied from RAM 44 to graphics generator 68 by way of bus 66 to be formatted for display on television receiver 30. Although the signals representative of the image are preferably stored in RAM 44 in this manner for later display, the signals can be immediately displayed when they are received by tuner 72 in an alternate embodiment of the invention.

Under the control of microprocessor 60, by way of graphics control line 64, the formatted image in graphics generator 68 is applied to switch 76 by way of generator line 70. Thus the signal on graphics control line 64 is an example of a signal provided in response to a channel change command from remote control device 20. Under the control of microprocessor 60 switch 76 can then apply the visual image received from graphics generator 68 to radio frequency modulator 78 for display on television receiver 30.

According to the method of the invention switch 76 can select either the image applied by tuner 72 by way of tuner line 74 or the image applied by graphics generator 68 by way of generator line 70 under the control of microprocessor 60 executing control method 80. The selected image is applied by switch 76 to radio frequency modulator 78 for display on television receiver 30.

When a visual image is applied to television receiver 30 by way of switch 76, it can be formatted by graphics generator 68 and displayed in any manner. For example, a full screen display can be provided on television receiver 30. Additionally, partial screen displays such as quadrants and windows can be provided. More than one visual image from the same advertiser or images for more than one advertiser can be provided during the same display. Furthermore, static or dynamic displays can be provided. In dynamic displays, for example, the image can be moved or sequential images can be provided. The visual image or images received from cable headend 12 and stored in RAM 44 or immediately displayed can also be combined with a library of additional images that can be stored in ROM 40 or RAM 44.

The transmission of visual images from cable headend 12 can include header fields. The header fields can be provided before and after the advertising information to indicate the beginning and end of the advertising information received by subscriber units 24a–n. They can also contain any other information relating to the visual image.

For example, the header information associated with an image can include the duration and frequency of display of the image as well as identification information. The identification information can include telephone, address, internet address, web page address, facsimile or telex information associated with an advertiser. The identification information can be stored for the most recently displayed images in order to permit later access by the user. For example, the identification information can be stored in a first-in, first-out stack in RAM 44 for access by means of remote control device 20 with a personal computer or by means of computer access line 50, wherein the term personal computer is understood to include any computer device available to the user for accessing information from a RAM. Additionally, the identification information can be stored at cable headend 12, at a predetermined internet address or by a company providing the optical disk or magnetic tape containing the advertising information to the cable headend 12 for later access by the user.

The images provided by way of transmission cable 16 can be a constant stream of changing images having any duration. For example, an image representative of a first advertiser can be transmitted for a period of thirty seconds and an image for a different advertiser can then be transmitted for the next thirty second period. Alternately, each of the images can be transmitted at the beginning of its period, stored for the duration of the period and written over by the next image at the beginning of the next period. In these embodiments, the user views whichever image is current when the channel is changed.

In these embodiments some visual images may not be viewed by a user because the user may not change channels while the images are current. Thus a priority status can be assigned to an image in order to instruct microprocessor 60 to save the priority image and display it when the next channel change occurs, regardless of how many other visual images are transmitted in the meantime. Priority status of an image can be indicated in the header field of the image. It is anticipated that an advertiser will pay a premium for receiving priority status.

In addition to receiving a constant stream of changing images and displaying a current image, the method of the present invention can receive and store a number of images in RAM 44 for access and display at a later time. The number of images that can be stored for later display is limited only by the amount of storage space.

The advertising information transmitted by cable headend 12 to cable subscriber systems 16a–n can be scheduled at the cable headend according to date and according to time of day. The scheduling can be determined according to agreements made with advertisers providing the visual images.

In the preferred embodiment of the invention, an advertising image is received by subscriber units 24a–n from the cable headend 12 by way of transmission cable 14 as previously described and applied to television receiver 30. However, it will be understood that audio information associated with the visual image can also be received by way of transmission cable 14 and applied to television receiver 30 when a channel change command is received. The audio information associated with the image information can be stored in RAM 44 along with the video image information. If audio advertising information is provided for generation of an audible message associated with the visual image any method of transmitting the audio can be used. Additionally, an aroma generating device or any other device useful to an advertiser can also be activated in response to a channel change within cable television system 10.

Furthermore, it will be understood that transmission cable 14 can be a coaxial cable, a fiber optic cable, a microwave link, a broadcast link, a satellite link, or any other transmission medium for transmitting television signals. Cable television system 10 can be any type of television transmission system and can include any such transmission medium. Cable subscriber systems 16a–n can include subscriber units 24a–n in a housing separate from television receiver 30, within television receiver 30 or in any other configuration.

It will be appreciated by those skilled in the art that changes may be made to the embodiments described above without departing from the broad inventive concept thereof. It is understood therefore, that this invention is not limited to the embodiments disclosed, but it is intended to cover modifications within the spirit and scope of the present invention as defined by the appended claims.

We claim:

1. A method for displaying an interchannel interval image in a cable system including a cable headend having a plurality of cable channels, a subscriber unit adapted to receive interchannel interval image data from the headend and a channel selector adapted to select a cable channel from the plurality of cable channels, the method comprising the steps of:

(a) transmitting the interchannel interval image data to the subscriber unit;

(b) selecting a first cable channel for displaying a first channel image;

(c) selecting a second cable channel for displaying a second channel image;

(d) determining a channel change in response to selecting the second cable channel;

(e) determining a time period between an end of the display of the first channel image and a beginning of the display of the second channel image;

(f) applying the transmitted interchannel interval image data to a video display in accordance with the determined time period to provide a display of the interchannel interval image between the end of the first channel image and beginning of the second channel image;

and (g) inhibiting the transmitted interchannel interval image data to the video display after a previous interchannel interval image has been displayed, the inhibiting step continuing for a predetermined amount of time.

2. The method for displaying an image according to claim 1, wherein the predetermined amount of time is between about thirty to fifty seconds.

3. The method for displaying an image according to claim 1, further comprising the step of determining a subscriber unit status of the subscriber unit and applying the interchannel interval image data to the video display in accordance with the determined subscriber unit status.

4. The method for displaying an image according to claim 1, further comprising the step of determining a time of day and transmitting the interchannel interval image data in accordance with the time of day.

5. The method for displaying an image according to claim 1, further comprising the step of determining a date and transmitting the interchannel interval image data in accordance with the determined date.

6. The method for displaying an image according to claim 1, further comprising the step of temporarily storing the transmitted interchannel interval image data in the subscriber unit.

7. The method for displaying an image according to claim 1, further comprising the steps of:

(g) transmitting further interchannel interval image data to the subscriber unit; and (h) storing the further transmitted interchannel interval image data in the subscriber unit.

8. The method for displaying an image according to claim 7, further comprising the step of displaying an image representative of the further interchannel interval image data on the video display in response to determining a further channel change.

9. The method for displaying an image according to claim 1, wherein a channel change interval is provided between said display of said first image and said display of said second image.

10. The method for displaying an image according to claim 9, wherein said image representative of said advertising information is displayed during said channel change interval.

11. The method for displaying an image according to claim 1, wherein the determined time period to provide a display of the interchannel interval image data is between about one hundred milliseconds and about three hundred and fifty milliseconds.

12. The method for displaying an image according to claim 1, wherein the interchannel interval image data is transmitted from the headend by way of a cable.

13. The method for displaying an image according to claim 1, wherein the interchannel interval image data further includes audio information and an audible signal is provided in response to the determining of the channel change.

14. The method for displaying an image according to claim 1, wherein said channel change is provided in accordance with a remote control device.

15. The method for displaying an image according to claim 14, wherein said remote control device comprises an infrared device.

16. The method for displaying an image according to claim 1, wherein said advertising information is transmitted by said cable headend.

17. The method for displaying an image according to claim 1, wherein the interchannel interval image data comprises signals representative of a plurality of images and the plurality of images is displayed in response to the determining of the channel change.

18. A system for displaying an interchannel interval image in a cable system including a cable headend having a plurality of cable channels, a subscriber unit adapted to receive interchannel interval image data from the headend and a channel selector adapted to select a cable channel from the plurality of cable channels and apply the selected cable channel to a video display in order to display the image, the system comprising:

(a) interchannel interval image data transmitted to the subscriber unit;

(b) a first display of a first image of a first received cable channel;

(c) a second display of a second image of a second received cable channel;

(d) the channel selector being adapted to change channels by terminating the first display and beginning the second display, (e) means for applying the transmitted interchannel interval image data to the video display between the change of channels in order to provide a display of an image representative of the interchannel interval image data;

and (f) means for applying the transmitted interchannel interval image data to the video display when a predetermined amount of time has elapsed since a previous channel change.

19. The system for displaying an image according to claim 18, further comprising a subscriber unit status indicator wherein the interchannel interval image data is applied to the video display in accordance with the subscriber unit status.

20. The system for displaying an image according to claim 18, further comprising further interchannel interval image data transmitted to the subscriber unit and stored therein for displaying an image representative of the further interchannel interval image data in response to a further channel change.

21. The system for displaying an image according to claim 18, wherein a channel change interval is provided between said display of said first image and said display of said second image.

22. The system for displaying an image according to claim 21, wherein the image representative of the interchannel interval image data is displayed during the channel change interval.

23. The system for displaying an image according to claim 18, wherein the image representative of the interchannel interval image data is displayed for a period of time between about one hundred milliseconds and about three hundred and fifty milliseconds.

24. The system for displaying an image according to claim 18, wherein the interchannel interval image data includes audio information and an audible signal is provided in response to the determining of the channel change.

25. The system for displaying an image according to claim 18, wherein the interchannel interval image data is transmitted by the cable headend.

* * * * *